(12) United States Patent
Kaarto et al.

(10) Patent No.: US 11,299,612 B2
(45) Date of Patent: Apr. 12, 2022

(54) TRANSPARENT POLYPROPYLENE COPOLYMER COMPOSITION HAVING IMPACT RESISTANCE

(71) Applicant: W.R. Grace & Co.-Conn., Columbia, MD (US)

(72) Inventors: John Kalevi Kaarto, Lake Jackson, TX (US); Jing Zhong, Columbia, MD (US); Amaia Montoya Goni, Columbia, MD (US)

(73) Assignee: W.R. GRACE & CO.-CONN., Columbia, MD (US)

( * ) Notice: Subject to any disclaimer, the term of this patent is extended or adjusted under 35 U.S.C. 154(b) by 0 days.

(21) Appl. No.: 17/046,247

(22) PCT Filed: Apr. 17, 2019

(86) PCT No.: PCT/US2019/027888
§ 371 (c)(1),
(2) Date: Oct. 8, 2020

(87) PCT Pub. No.: WO2019/204454
PCT Pub. Date: Oct. 24, 2019

(65) Prior Publication Data
US 2021/0070971 A1    Mar. 11, 2021

Related U.S. Application Data

(60) Provisional application No. 62/659,214, filed on Apr. 18, 2018.

(51) Int. Cl.
    *C08L 23/16*            (2006.01)
    *C08L 23/14*            (2006.01)

(52) U.S. Cl.
    CPC ............ *C08L 23/142* (2013.01); *C08L 23/16* (2013.01); *C08L 2205/025* (2013.01); *C08L 2207/02* (2013.01); *C08L 2314/02* (2013.01)

(58) Field of Classification Search
None
See application file for complete search history.

(56) References Cited

U.S. PATENT DOCUMENTS

2010/0233399 A1*    9/2010    Pradella ................ C08L 23/12
                                                                     428/36.4
2014/0288228 A1*    9/2014    Mehta .................. C08L 23/14
                                                                     524/528

(Continued)

FOREIGN PATENT DOCUMENTS

| EP | 2 639 268 A1 | 9/2013 |
|---|---|---|
| WO | 2014/109740 | 7/2014 |
| WO | WO-2016/148950 A1 | 9/2016 |

OTHER PUBLICATIONS

Sherman, "IMPACT: Which Test to Use? Which Instrument to Buy?", Oct. 1, 2001 (Oct. 1, 2001) retrieved on Jun. 13, 2019 from https://www.ptonline.com/articles/impact-which-test-to-use-which-instrument-to-buy; entire document, especially p. 2 para 5.

*Primary Examiner* — Richard A Huhn
(74) *Attorney, Agent, or Firm* — Foley & Lardner LLP

(57) ABSTRACT

Polypropylene polymer compositions are disclosed that can be formulated to have excellent transparency properties in conjunction with excellent impact resistance properties. The polypropylene polymer compositions are heterophasic compositions containing a first phase polymer combined with a second phase polymer. The first phase polymer is a polypropylene and alpha-olefin copolymer while the second phase polymer is also a polypropylene and alpha-olefin random copolymer. The first phase polymer contains ethylene in an amount less than 5% by weight and is present in an amount greater than the second phase polymer. The second phase polymer has elastomeric properties.

20 Claims, 1 Drawing Sheet

(56) References Cited

U.S. PATENT DOCUMENTS

2015/0045514 A1* 2/2015 Destro .................. C08L 23/142
　　　　　　　　　　　　　　　　　　　　525/240
2015/0259453 A1　9/2015 Peterson et al.

* cited by examiner

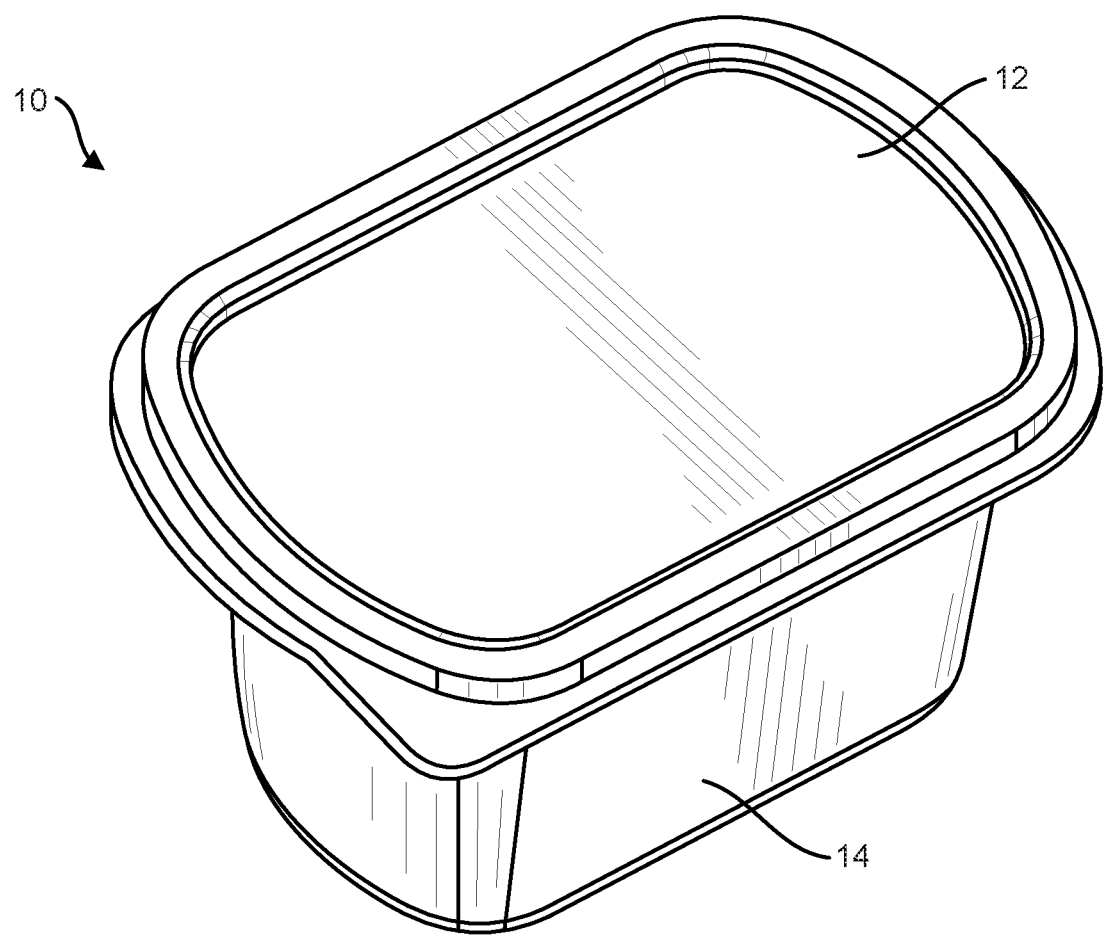

TRANSPARENT POLYPROPYLENE COPOLYMER COMPOSITION HAVING IMPACT RESISTANCE

CROSS-REFERENCE TO RELATED APPLICATION

The present application claims filing benefit of U.S. Provisional Patent Application Ser. No. 62/659,214 having a filing date of Apr. 18, 2018, and which is incorporated herein by reference in its entirety.

BACKGROUND

Transparency is a highly desired property for many polymer applications. For example, polymers can be used to produce various different products such as packaging or containers where transparency can be very beneficial to the user. In many situations, for instance, it is highly advantageous to view the contents of the packaging or the container through the walls of the packaging or the container.

One type of polymer that can be made highly transparent is semi-crystalline polypropylene homopolymers. Polypropylene homopolymers are generally very translucent due to a high crystallinity and large spherulites. The transparency of polypropylene polymers can be improved by incorporating ethylene or another alpha-olefin into the polymer chain to generate a polypropylene random copolymer. Nucleators and/or clarifiers can also be incorporated into the polymer to further decrease the crystal size and increase the clarity.

Although polypropylene random copolymers have excellent transparency properties, the polymers have a tendency to have relatively low impact resistance. Thus, for refrigerator or freezer storage containers and/or for long term storage containers, greater impact resistance is needed. When attempts are made to increase the impact resistance of polypropylene polymers, however, the transparency of the polymers can be degraded.

In the past, polypropylene impact copolymers have been designed that include a homopolymer matrix blended with a rubber-like propylene-alpha-olefin copolymer phase. The copolymer phase is intended to increase impact resistance, such as at cold temperatures. The propylene-alpha-olefin copolymer can be mostly amorphous and thus have elastomeric properties forming a rubber phase within the polymer composition. The incorporation of the propylene-alpha-olefin copolymer does improve the impact resistance but sacrifices the clarity.

In order to improve the transparency of heterophasic polypropylene compositions containing a rubber phase, those skilled in the art have attempted to match the refractive index between the matrix polymer and the rubber phase polymer. For instance, adding ethylene to the matrix polymer can be used to reduce the difference in refractive index between the matrix phase and the rubber phase. Past attempts, however, have failed to adequately provide a polymer composition having a desired blend of transparency and impact strength.

SUMMARY

In general, the present disclosure is directed to a polypropylene polymer composition having an improved balance of properties. Polypropylene polymer compositions made in accordance with the present disclosure, for instance, can be formulated to have high transparency in combination with excellent impact resistance strength. For instance, the polymer composition can display a relatively low haze value while having excellent toughness properties. In one embodiment, the polypropylene polymer composition includes a polypropylene random copolymer combined with a rubber-like propylene ethylene copolymer. The ethylene content of each polymer phase can be controlled within desired limits. In addition, the relative amounts of each polymer phase can be selected so as to maximize certain properties. In one embodiment, the polymers that are blended together are both made using a particular type of Ziegler-Natta catalyst system that can enable careful control over the different parameters and variables during polymer processing.

In one embodiment, for instance, the present disclosure is directed to a polypropylene composition including a first polymer phase combined or blended with a second polymer phase. The first polymer phase comprises a polypropylene random copolymer. The polypropylene random copolymer can contain ethylene in an amount less than about 4% by weight, such as in an amount from about 2% to about 3.5% by weight. The polypropylene random copolymer can have a xylene soluble fraction of less than about 10%, such as less than about 8%. The polypropylene random copolymer is generally present in the polymer composition in an amount greater than about 50% by weight, such as in an amount greater than about 60% by weight, such as in an amount greater than about 70% by weight.

The second polymer phase blended with the first polymer phase generally comprises an elastomeric-like propylene ethylene copolymer containing ethylene in an amount from about 10% to about 20% by weight. The elastomeric propylene ethylene copolymer can be generally in an amount greater than about 10% by weight, such as in an amount greater than about 15% by weight, such as in an amount greater than about 20% by weight, and generally in an amount less than about 40% by weight, such as in an amount less than about 30% by weight.

When combined together, the above polymer phases produce a polypropylene composition having an excellent blend of properties. The polypropylene composition, for instance, can have a melt flow rate of about 15 g/10 min or greater, can contain a clarifier and have a haze at 1 mm of less than about 15%, and can have an IZOD impact strength at 23° C. of greater than about 200 J/m, such as greater than about 300 J/m and at 0° C. of greater than about 80 J/m. In addition, the xylene soluble portion of the composition may have a Koenig B value of from 0.75 to less than 1. Furthermore, the xylene insoluble portion may have a Koenig B value of from 0.75 to less than 1.

As indicated above, the polymer composition can contain a clarifier. The clarifier can be present in an amount less than about 5% by weight, such as in an amount less than about 3% by weight, and generally in an amount greater than about 0.2% by weight.

The polymer composition of the present disclosure can be used to make numerous and different types of products. In one embodiment, the polymer composition can be used to form various different molded articles, such as injection molded articles. In one embodiment, the polymer composition can be used to form containers, such as storage containers. The storage containers, for instance, can be configured to hold a food item or can be used to form long term storage containers for warehouses, attics, garages, and the like. The polymer composition of the present disclosure is particularly well suited for producing packaging that is subjected to colder temperatures during transportation, distribution, sale, or use. For example, the polymer composition is particularly well suited for containing food items that are to be refrigerated.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying FIGURES, in which:

FIG. 1 is a perspective view of one embodiment of a container made in accordance with the present disclosure.

Repeat use of reference characters in the present specification and drawings is intended to represent the same or analogous features or elements of the present invention.

Definitions and Testing Procedures

The term "propylene-ethylene copolymer", as used herein, is a copolymer containing a majority weight percent propylene monomer with ethylene monomer as a secondary constituent. A "propylene-ethylene copolymer" (also sometimes referred to as a polypropylene random copolymer, PPR, PP-R, RCP or RACO) is a polymer having individual repeating units of the ethylene monomer present in a random or statistical distribution in the polymer chain.

Melt flow rate (MFR), as used herein, is measured in accordance with the ASTM D 1238 test method at 230° C. with a 2.16 kg weight for propylene-based polymers.

Xylene solubles (XS) is defined as the weight percent of resin that remains in solution after a sample of polypropylene random copolymer resin is dissolved in hot xylene and the solution is allowed to cool to 25° C. This is also referred to as the gravimetric XS method according to ASTM D5492-98 using a 90 minute precipitation time and is also referred to herein as the "wet method". XS can also be measured according to the Viscotek method, as follows: 0.4 g of polymer is dissolved in 20 ml of xylenes with stirring at 130° C. for 60 minutes. The solution is then cooled to 25° C. and after 90 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration is maintained with Viscotek PoyCAL™ polystyrene standards. A homopolymer, e.g. Dow 5D98, is used as a reference material to ensure that the Viscotek instrument and sample preparation procedures provide consistent results by using 5D98 as a control sample to check method performance. The XS value for 5D98 is initially derived from testing using the ASTM method identified above.

The xylene soluble portion is determined by a method adapted from ASTM D5492-06 and also sometimes referred to herein as the "wet method". The procedure consists of weighing 2 g of sample and dissolving the sample, in 200 ml o-xylene in a 400 ml flask with 24/40 joint. The flask is connected to a water cooled condenser and the contents are stirred and heated to reflux under nitrogen ($N_2$), and then maintained at reflux for an additional 30 minutes. The solution is then cooled in a temperature controlled water bath at 25° C. for 90 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. The xylene soluble portion is calculated as XS (wt %)=$[(m_3-m_2)*2/m_1]*100$, where $m_1$ is the original weight of the sample used, $m_2$ is the weight of empty aluminum pan, and $m_3$ is the weight of the pan and residue (the asterisk, *, here and elsewhere in the disclosure indicates that the identified terms or values are multiplied).

The Koenig B value which is a measure of randomness or blockiness in a copolymer is calculated by: Koenig B=[EP]/(2[P][E]), where [EP] is the total mole fraction of EP dimers (EP+PE). ("Spectroscopy of Polymers" 2nd edition, Jack L. Koenig, 1999, Elsevier; pp 17-18).

Flexural modulus is determined in accordance with ASTM D790-10 Method A at 1.3 mm/min, using a Type 1 specimen per ASTM 3641 and molded according to ASTM D4101.

Mw/Mn (also referred to as "MWD") and Mz/Mw are measured by GPC according to the Gel Permeation Chromatography (GPC) Analytical Method for Polypropylene. The polymers are analyzed on a PL-220 series high temperature gel permeation chromatography (GPC) unit equipped with a refractometer detector and four PLgel Mixed A (20 μm) columns (Polymer Laboratory Inc.). The oven temperature is set at 150° C. and the temperatures of autosampler's hot and the warm zones are at 135° C. and 130° C. respectively. The solvent is nitrogen purged 1,2,4-trichlorobenzene (TCB) containing ~200 ppm 2,6-di-t-butyl-4-methylphenol (BHT). The flow rate is 1.0 mL/min and the injection volume was 200 μl. A 2 mg/mL sample concentration is prepared by dissolving the sample in N2 purged and preheated TCB (containing 200 ppm BHT) for 2.5 hrs at 160° C. with gentle agitation.

The GPC column set is calibrated by running twenty narrow molecular weight distribution polystyrene standards. The molecular weight (MW of the standards ranges from 580 to 8,400,000 g/mol, and the standards were contained in 6 "cocktail" mixtures. Each standard mixture has at least a decade of separation between individual molecular weights. The polystyrene standards are prepared at 0.005 g in 20 mL of solvent for molecular weights equal to or greater than 1,000,000 g/mol and 0.001 g in 20 mL of solvent for molecular weights less than 1,000,000 g/mol. The polystyrene standards are dissolved at 150° C. for 30 min under stirring. The narrow standards mixtures are run first and in order of decreasing highest molecular weight component to minimize degradation effect. A logarithmic molecular weight calibration is generated using a fourth-order polynomial fit as a function of elution volume. The equivalent polypropylene molecular weights are calculated by using following equation with reported Mark-Houwink coefficients for polypropylene (Th. G. Scholte, N. L J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{PP} = \left( \frac{K_{PS} M_{PS}^{a_{PS}+1}}{K_{PP}} \right)^{\frac{1}{a_{PP}+1}}$$

where $M_{pp}$ is PP equivalent MW, $M_{PS}$ is PS equivalent MW, log K and a values of Mark-Houwink coefficients for PP and PS are listed below in Table 1.

TABLE 1

| Polymer | A | Log K |
|---|---|---|
| Polypropylene | 0.725 | −3.721 |
| Polystyrene | 0.702 | −3.900 |

IZOD impact strength is measured in accordance with ASTM D 256 on specimens molded according to ASTM D4101.

Gardner Impact Testing is measured in accordance with ASTM D5420.

Haze is measured in accordance with ASTM Test D1003 Procedure A using BYK Gardner Haze-Gard Plus 4725 on a 1 mm thick injection molded specimen.

The term β/α relates to the ratio of the molecular weight of the copolymer of the discontinuous phase to the molecular weight of the propylene-based polymer of the continuous phase where β and α are the values of the intrinsic viscosity of the copolymer and propylene-based polymer fractions, respectively, as measured in decalin at 135° C. (ASTM D 1601). For the purposes of this disclosure, the value of β/α is calculated from the MFR of the matrix polymer, the MFR of the whole impact copolymer and Fc before visbreaking, as follows.

$$B/\alpha = 1 + \frac{(MFR_{matrix}/MFR_{whole})0.213 - 1}{Fc}$$

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to a polypropylene composition having a unique blend of physical properties. For instance, in one embodiment, the polymer composition can be formulated so as to have not only excellent transparency characteristics, but also excellent impact resistance properties. In addition, the polymer composition can be formulated to have good flow characteristics. Thus, the polymer composition is particularly well suited to forming injection molded articles. In one embodiment, for instance, the polymer composition can be used to form containers, particularly storage containers in which the product or item placed in the container can be viewed through the walls of the container or package.

In general, the polypropylene composition of the present disclosure comprises a heterophasic composition. In particular, the polypropylene composition includes a first polymer phase blended with a second polymer phase. Both polymer phases are formed from a polypropylene copolymer containing controlled amounts of an alpha-olefin, such as ethylene. For example, in one embodiment, the first polymer phase comprises a polypropylene random copolymer containing ethylene in an amount less than about 4% by weight. The first polymer phase is generally present in the polymer composition in an amount greater than the second polymer phase and therefor forms a matrix polymer. The second polymer phase, on the other hand, comprises a polypropylene copolymer having elastomeric or rubber-like properties. The second polymer phase, for instance, may comprise a propylene ethylene copolymer containing ethylene in an amount greater than about 10% by weight. The two different polymer phases can be blended together in order to optimize physical properties for a particular application. For example, in one embodiment, the two polymer phases can be blended together in order to maximize transparency in combination with impact strength.

For example, the polymer composition of the present disclosure can have an IZOD impact strength at 23° C. of greater than about 200 J/m, such as greater than about 300 J/m, such as greater than about 325 J/m, such as greater than about 350 J/m, such as greater than about 375 J/m, such as greater than about 400 J/m, such as greater than about 425 J/m, such as even greater than 450 J/m. The IZOD impact strength at 23° C. is generally less than about 900 J/m. The polymer composition can also display excellent impact strength at lower temperatures. For instance, the polymer composition can have an IZOD impact strength at 0° C. of greater than about 80 J/m, such as greater than about 85 J/m, such as greater than about 90 J/m, the IZOD impact strength at 0° C. is generally less than about 600 J/m.

The polymer composition of the present disclosure can also display excellent impact strength properties when tested according to the Gardner impact test. For example, the polymer composition can display a Gardner impact resistance at 0° C. of greater than about 300 inch-lbs, such as greater than about 310 inch-lbs, such as greater than about 320 inch-lbs, such as greater than about 330 inch-lbs, such as greater than about 340 inch-lbs, such as greater than about 350 inch-lbs, and generally less than about 500 inch lbs.

As described above, in addition to excellent impact strength properties, the polymer composition of the present disclosure can also have very good transparency properties. For instance, the polymer composition can have a haze at 1 mm of less than about 15%, such as less than about 13%, such as less than about 10%, such as even less than about 9%. The haze at 1 mm is generally greater than about 1%.

The flexible nature of the polymer composition can vary depending upon various factors including the relative amounts of the first polymer phase and the second polymer phase and the amount of comonomer in the first phase. In general, the polymer composition of the general disclosure can have a flexural modulus of less than about 1000 MPa, such as less than about 900 MPa, such as less than about 800 MPa, such as less than about 700 MPa. In one embodiment, the polymer composition can have a flexural modulus of less than about 600 MPa. In general, the flexural modulus is greater than about 200 MPa, such as greater than about 400 MPa, such as greater than about 500 MPa.

The term β/α relates to the ratio of the molecular weight of the elastomeric copolymer to the molecular weight of the matrix polymer or the polymer of the first polymer phase. The molecular weight of each polymer is proportional to the intrinsic viscosity of each polymer. The intrinsic viscosity indicates the viscosity of a solution of the polymer in a given solvent and at a given temperature. In the past, in order to increase transparency, the second phase polymer was reduced in order to lower the β/α ratio. Unexpectedly, however, it was discovered that polymer compositions of the present disclosure can have higher β/α ratios while still possessing excellent transparency properties. For instance, the polymer composition of the present disclosure can have a β/α ratio of greater than about 1, such as greater than or equal to 1.1. For example, the β/α ratio can be greater than about 1.2, such as greater than about 1.3. In general, the β/α ratio is less than about 2, such as less than about 1.8, such as less than about 1.6.

Polymer compositions formulated in accordance with the present disclosure can also have excellent flow properties while retaining relatively high impact strength. For example, the polymer composition of the present disclosure can have a melt flow rate of greater than about 3 g/10 mins, such as greater than about 10 g/10 mins, such as greater than about 15 g/10 mins, such as greater than about 17 g/10 mins, such as greater than about 19 g/10 mins, such as greater than about 20 g/10 mins. The melt flow rate is generally less than about 80 g/10 mins, such as less than about 70 g/10 mins, such as less than about 50 g/10 mins, such as less than about 35 g/10 mins, such as less than about 30 g/10 mins. The above flow properties make the polymer composition well suited for use in injection molding applications.

The polymer composition of the present disclosure can also be produced having a relatively low xylene soluble content in the matrix phase. Overall, the polymer composition can have a total xylene soluble content or fraction of less than about 40% by weight, such as less than about 30% by weight, such as less than about 28% by weight, such as less than about 25% by weight, such as less than about 23% by weight, such as less than about 20% by weight. The xylene soluble content is generally greater than about 2% by weight, such as greater than about 5% by weight, such as greater than about 10% by weight, such as greater than about 15% by weight.

In addition, the polymer composition may also have a desirable Koenig B value. As indicated herein, the Koenig B value is generally a measure of randomness or blockiness of a copolymer wherein the value can range from 0 to 2. Generally, a relatively low value suggests a more blocky or clustered comonomer distribution while a relatively high value suggests more alternating of the comonomer distribution. Meanwhile, a value of 1 generally suggests a perfectly random distribution of comonomer units.

In this regard, the polymer composition as disclosed herein exhibits a Koenig B value generally closer to 1. For instance, the polymer composition may exhibit a Koenig B value of 0.75 or more, such as 0.8 or more, such as 0.83 or more, such as 0.85 or more. In addition, the polymer composition may exhibit a Koenig B value of less than 1, such as 0.95 or less, such as 0.9 or less, such as 0.88 or less, such as 0.86 or less. In particular, as indicated herein, the polymer composition may have a xylene soluble portion and a xylene insoluble portion. In this regard, the xylene soluble portion may have a Koenig B value of 0.75 or more, such as 0.8 or more, such as 0.83 or more, such as 0.85 or more. In addition, the xylene soluble portion may have a Koenig B value of less than 1, such as 0.95 or less, such as 0.9 or less, such as 0.88 or less, such as 0.86 or less. Furthermore, the xylene insoluble portion may have a Koenig B value of 0.75 or more, such as 0.8 or more, such as 0.83 or more, such as 0.85 or more. In addition, the xylene insoluble portion may have a Koenig B value of less than 1, such as 0.95 or less, such as 0.9 or less, such as 0.88 or less, such as 0.86 or less.

As described above, the polypropylene composition of the present disclosure generally includes a first phase polymer combined with a second phase polymer. The first phase polymer comprises a random copolymer of polypropylene. The random copolymer, for instance, can be a copolymer of propylene and an alpha-olefin, such as ethylene. The polypropylene random copolymer forms the matrix polymer in the polypropylene composition and can contain the alpha-olefin in an amount less than about 4% by weight, such as in an amount less than about 3.8% by weight, such as in an amount less than about 3.5% by weight, and generally in an amount greater than about 0.5% by weight, such as in an amount greater than about 1% by weight, such as in an amount greater than about 1.5% by weight, such as in an amount greater than about 2% by weight. The first phase polymer can have a xylene soluble content of generally less than about 12% by weight, such as in an amount less than about 10% by weight, such as in an amount less than about 8% by weight, such as in an amount less than about 6% by weight, such as in an amount less than about 4% by weight. The xylene soluble content is generally greater than about 0.5% by weight, such as greater than about 3% by weight.

As will be described in greater detail below, the first phase polymer can comprise a Ziegler-Natta catalyzed polymer and can have a relatively broad molecular weight distribution. For instance, the molecular weight distribution (Mw/Mn) greater than about 3.8, such as greater than about 4, such as greater than about 4.3, such as greater than about 4.5, such as greater than about 4.8, such as greater than about 5, such as greater than about 5.2, such as greater than about 5.5, such as greater than about 5.7, such as greater than about 6, and generally less than about 9, such as less than about 8.5, such as less than about 8. The weight average molecular weight (determined by GPC) of the first phase polymer is generally greater than about 100,000, such as greater than about 120,000.

The polypropylene random copolymer that makes up the first phase polymer, in one embodiment, has a relatively high melt flow rate. For instance, the first phase polymer can have a melt flow rate of greater than about 15 g/10 mins, such as greater than about 18 g/10 mins, such as greater than about 20 g/10 mins, such as greater than about 22 g/10 mins, such as greater than about 25 g/10 mins. The melt flow rate of the first phase polymer is generally less than about 80 g/10 mins, such as less than about 50 g/10 mins.

The second phase polymer is also a propylene and alpha-olefin copolymer. The second phase polymer, however, has elastomeric or rubber-like properties. Thus, the second phase polymer can dramatically improve the impact strength resistance of the polymer composition.

The second phase polymer which forms a dispersed phase within the polymer composition contains the alpha-olefin or ethylene in an amount generally greater than about 10% by weight, such as in an amount greater than about 12% by weight, such as in an amount greater than about 14% by weight and generally less than about 40% by weight, such as less than about 30% by weight, such as less than about 20% by weight, such as in an amount less than about 17% by weight. The second phase polymer can have a weight average molecular weight of at least about 130,000, such as at least about 140,000, such as at least about 150,000 and generally less than about 500,000. As used herein, the second phase polymer is not equal to the total xylene solubles.

In addition to the first phase polymer and the second phase polymer, the polypropylene composition of the present disclosure can contain various other additives and ingredients. For instance, the polypropylene composition can contain nucleators, mold release agents, slip agents, antiblocks, UV stabilizers, heat stabilizer (e.g. DSTDP), colorants/tints, and the like. In one embodiment, the polymer composition can contain an antioxidant, such as a hindered phenolic antioxidant. The polymer composition can also contain an antacid. For instance, the polymer composition can contain an antacid and an antioxidant. The polymer composition can also contain an acid scavenger. Each of the additives can be present in the polymer composition generally in an amount less than about 3% by weight, such as in an amount less than about 2% by weight, such as in an amount less than about 1% by weight, such as in an amount less than about 0.5% by weight, and generally in an amount greater than about 0.001% by weight.

In one embodiment, the polypropylene composition can further contain a clarifying agent. The clarifying agent can be added to further improve the transparency properties of the composition. The clarifying agent, for instance, can comprise a compound capable of producing a gelation network within the composition.

In one embodiment, the clarifying agent may comprise a sorbitol compound, such as a sorbitol acetal derivative. In one embodiment, for instance, the clarifying agent may comprise a dibenzyl sorbitol.

With regard to sorbitol acetal derivatives that can be used as an additive in some embodiments, the sorbitol acetal derivative is shown in Formula (I):

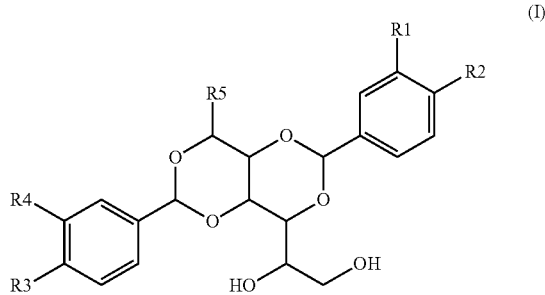

wherein R1-R5 comprise the same or different moieties chosen from hydrogen and a C1-C3 alkyl.

In some embodiments, R1-R5 are hydrogen, such that the sorbitol acetal derivative is 2,4-dibenzylidene sorbitol ("DBS"). In some embodiments, R1, R4, and R5 are hydrogen, and R2 and R3 are methyl groups, such that the sorbitol acetal derivative is 1,3:2,4-di-p-methyldibenzylidene-D-sorbitol ("MDBS"). In some embodiments, R1-R4 are methyl groups and R5 is hydrogen, such that the sorbitol acetal derivative is 1,3:2,4-Bis (3,4-dimethylobenzylideno) sorbitol ("DMDBS"). In some embodiments, R2, R3, and R5 are propyl groups (CH2-CH2-CH3), and R1 and R4 are hydrogen, such that the sorbitol acetal derivative is 1,2,3-trideoxy-4,6:5,7-bis-O-(4-propylphenyl methylene) nonitol ("TBPMN").

Other embodiments of clarifying agents that may be used include:
  1,3:2,4-dibenzylidenesorbitol
  1,3:2,4-bis(p-methylbenzylidene)sorbitol
  Di(p-methylbenzylidene)Sorbitol
  Di(p-ethylbenzylidene)Sorbitol
  Bis(5',6',7',8'-tetrahydro-2-naphtylidene)Sorbitol In one embodiment, the clarifying agent may also comprise a bisamide, such as benzenetrisamide. The clarifying agents described above can be used alone or in combination.

When present in the polymer composition, one or more clarifying agents are generally added in an amount greater than about 200 ppm, such as in an amount greater than about 1,800 ppm, such as in an amount greater than about 2,000 ppm, such as in an amount greater than about 2,200 ppm. One or more clarifying agents are generally present in an amount less than about 8,000 ppm, such as less than about 6,000 ppm, such as less than about 5,000 ppm. The amount of clarifying agent present in the composition can depend upon various factors including the type of clarifier that is used.

The first phase polymer and the second phase polymer can be produced using various different polymerization methods and procedures. In one embodiment, a Ziegler-Matta catalyst is used to produce both polymers. For example, the olefin polymerization can occur in the presence of a catalyst system that includes a catalyst, an internal electron donor, a cocatalyst, and optionally an external electron donor. Olefins of the formula $CH_2=CHR$, where R is hydrogen or a hydrocarbon radical with 1 to 12 atoms, can be contacted with the catalyst system under suitable conditions to form the polymer products. Copolymerization may occur in a method-step process in order to generate the heterophasic composition of the present disclosure. The polymerization process can be carried out using known techniques in the gas phase using fluidized bed or stir bed reactors or in a slurry phase using an inert hydrocarbon solvent or diluent or liquid monomer.

In one embodiment, the first phase polymer and the second phase polymer can be produced in a two-stage process that includes a first stage, in which the propylene random copolymer of the continuous polymer phase is prepared, and a second stage, in which the electromeric propylene copolymer is produced. The first stage polymerization can be carried out in one or more bulk reactors or in one or more gas phase reactors. The second stage polymerization can be carried out in one or more gas phase reactors. The second stage polymerization is typically carried out directly following the first stage polymerization. For example the polymerization product recovered from the first polymerization stage can be conveyed directly to the second polymerization stage. A heterophasic copolymer composition is produced.

In one embodiment of the present disclosure, the polymerizations are carried out in the presence of a stereoregular olefin polymerization catalyst. For example, the catalyst may be a Ziegler-Natty catalyst. For instance, in one embodiment, a catalyst sold under the trade name CONSISTA and commercially available from W. R. Grace & Company can be used. In one embodiment, electron donors are selected that do not contain phthalates.

In one embodiment, the catalyst includes a procatalyst composition that contains a titanium moiety such as titanium chloride, a magnesium moiety such as magnesium chloride, and at least one internal electron donor.

The procatalyst precursor can include (i) magnesium, (ii) a transition metal compound from Periodic Table groups IV-VII, (iii) a halide, an oxylahilde, and or an alkoxide, and/or an alkoxide of (i) or (i) and/or (ii), and (iv) combination of (i), (ii), and (iii). Non limiting examples of suitable procatalyst precursors include halides, oxyhalides, alkoxides of magnesium, manganese, titanium, vanadium, chromium, molybdenum, zirconium, hafnium, and combinations thereof.

In an embodiment, the procatalyst precursor contains magnesium as the sole metal component. Non limiting examples include anhydrous magnesium chloride and/or its alcohol adduct, magnesium alkoxide, and or aryloxide, mixed magnesium alkoxy halide, and/or carboxylated magnesium dialkoxide or aryloxide.

In an embodiment, the procatalyst precursor is an alcohol adduct of anhydrous magnesium chloride. The anhydrous magnesium chloride adduct is generally defined as $MgCl_2$-nROH where n has a range of 1.5-6.0, preferably 2.5-4.0, and most preferably 2.8-3.5 moles total alcohol. ROH is a $C_1$-$C_4$ alcohol, linear or branched, or mixture of alcohol. Preferably ROH is ethanol or a mixture of ethanol and a higher alcohol. If ROH is a mixture, the mole ratio of ethanol to higher alcohol is at least 80:20, preferably 90:10, and most preferably at least 95:5.

In one embodiment, a substantially spherical $MgCl_2$-nEtOH adduct may be formed by a spray crystallization process. In one, embodiment the spherical $MgCl_2$ precursor has an average particle size (Malvern $d_{50}$) of between about 15-150 microns, preferably between 20-100 microns, and most preferably between 35-85 microns.

In one embodiment, the procatalyst precursor contains a transition metal compound and a magnesium metal compound. The transition metal compound has the general formula $TrX_x$ where Tr is the transition metal, X is a halogen or a $C_{1-10}$ hydrocarboxyl or hydrocarbyl group, and x is the number of such X groups in the compound in combination with a magnesium metal compound. Tr may be a Group IV, V or VI metal. In one embodiment, Tr is a Group IV metal, such as titanium. X may be chloride, bromide, $C_{1-4}$ alkoxide or phenoxide, or a mixture thereof. In one embodiment, X is chloride.

The precursor composition may be prepared by the chlorination of the foregoing mixed magnesium compounds, titanium compounds, or mixtures thereof In one embodiment, the precursor composition is a mixed magnesium/titanium compound of the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine; d is 0.5 to 56; or 2-4, or 3; f is 2 to 116, or 5 to 15; and g is 0.5 to 116, or 1 to 3.

In accordance with the present disclosure, the above described procatalyst precursor is combined with at least one internal electron donor. The internal electron donor can comprise a substituted phenylene aromatic diester.

In one embodiment, the first internal electron donor comprises a substituted phenylene aromatic diester having the following structure (I):

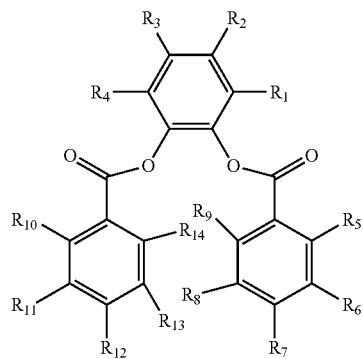

wherein $R_1$-$R_{14}$ are the same or different. Each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one $R_1$-$R_{14}$ is not hydrogen.

In one embodiment, the substituted phenylene aromatic diester may be any substituted phenylene aromatic diester as disclosed in U.S. Patent Application Ser. No. 61/141,959 filed on Dec. 31, 2008, the entire content of which is incorporated by reference herein.

In one embodiment, the substituted phenylene aromatic diester may be any substituted phenylene aromatic diester disclosed in WO12088028, filed on Dec. 20, 2011, the entire content of which is incorporated by reference herein.

In one embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In one embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In one embodiment, the inter-/intra-cyclic structure is a $C_5$ or a $C_6$ membered ring.

In one embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In one embodiment, any consecutive R groups in $R_1$-$R_4$, and/or in $R_5$-$R_9$, and/or in $R_{10}$-$R_{14}$, may be members of a $C_5$-$C_6$-membered ring.

In one embodiment, structure (I) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, $R_2$ is selected from a $C_1$-$C_8$ alkyl group, a $C_3$-$C_6$ cycloalkyl, or a substituted $C_3$-$C_6$ cycloalkyl group. $R_2$ can be a methyl group, an ethyl group, a n-propyl group, an isopropyl group, a t-butyl group, an isobutyl group, a sec-butyl group, a 2,4,4-trimethylpentan-2-yl group, a cyclopentyl group, and a cyclohexyl group.

In one embodiment, structure (I) includes $R_2$ that is methyl, and each of $R_5$-$R_{14}$ is hydrogen.

In one embodiment, structure (I) includes $R_2$ that is ethyl, and each of $R_5$-$R_{14}$ is hydrogen.

In one embodiment, structure (I) includes $R_2$ that is t-butyl, and each of $R_5$-$R_{14}$ is hydrogen.

In one embodiment, structure (I) includes $R_2$ that is ethoxycarbonyl, and each of $R_5$-$R_{14}$ is hydrogen.

In one embodiment, structure (I) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ that is methyl, and each of $R_5$-$R_{14}$ is hydrogen.

In one embodiment, structure (I) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In one embodiment, structure (I) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_8$ alkyl group or a halogen.

In one embodiment, structure (I) includes $R_1$ that is a methyl group and $R_3$ that is a t-butyl group. Each of $R_2$, $R_4$ and $R_5$-$R_{14}$ is hydrogen.

In one embodiment, structure (I) includes $R_1$ and $R_3$ that is an isopropyl group. Each of $R_2$, $R_4$ and $R_5$-$R_{14}$ is hydrogen.

In one embodiment, structure (I) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In one embodiment, structure (I) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In one embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In one embodiment, the substituted phenylene aromatic diester has a structure (II) which includes $R_1$ that is a methyl group and $R_3$ is a t-butyl group. Each of $R_2$ and $R_4$ is hydrogen. $R_8$ and $R_9$ are members of a $C_6$ membered ring to form a 1-naphthoyl moiety. $R_{13}$ and $R_{14}$ are members of a $C_6$ membered ring to form another 1-naphthoyl moiety. Structure (II) is provided below.

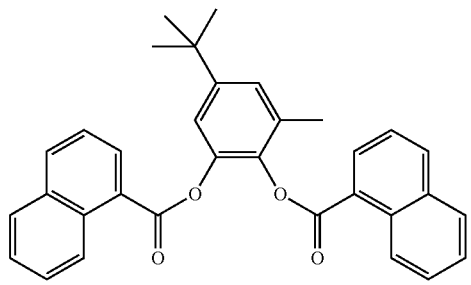 [SMILES: Cc1cc(C(C)(C)C)cc(OC(=O)c2cccc3ccccc23)c1OC(=O)c1cccc2ccccc12]

In one embodiment, the substituted phenylene aromatic diester has a structure (III) which includes $R_1$ that is a methyl group and $R_3$ is a t-butyl group. Each of $R_2$ and $R_4$ is hydrogen. $R_6$ and $R_7$ are members of a $C_6$ membered ring to form a 2-naphthoyl moiety. $R_{12}$ and $R_{13}$ are members of a $C_6$ membered ring to form a 2-naphthoyl moiety. Structure (III) is provided below.

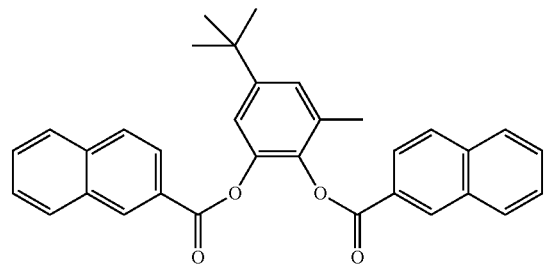 [SMILES: Cc1cc(C(C)(C)C)cc(OC(=O)c2ccc3ccccc3c2)c1OC(=O)c1ccc2ccccc2c1]

In one embodiment, structure (I) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In one embodiment, structure (I) includes R$_1$ that is a methyl group and R$_3$ is a t-butyl group. Each of R$_6$, R$_7$, R$_{11}$, and R$_{12}$ is a chlorine atom. Each of R$_2$, R$_4$, R$_5$, R$_8$, R$_9$, R$_{10}$, R$_{13}$, and R$_{14}$ is hydrogen.

In one embodiment, structure (I) includes R$_1$ that is a methyl group and R$_3$ is a t-butyl group. Each of R$_6$, R$_8$, R$_{11}$, and R$_{13}$ is a chlorine atom. Each of R$_2$, R$_4$, R$_5$, R$_7$, R$_9$, R$_{10}$, R$_{12}$, and R$_{14}$ is hydrogen.

In one embodiment, structure (I) includes R$_1$ that is a methyl group and R$_3$ is a t-butyl group. Each of R$_2$, R$_4$ and R$_5$-R$_{14}$ is a fluorine atom.

In one embodiment, structure (I) includes R$_1$ that is a methyl group and R$_3$ is a t-butyl group. Each of R$_7$ and R$_{12}$ is a trifluoromethyl group. Each of R$_2$, R$_4$, R$_5$, R$_6$, R$_8$, R$_9$, R$_{10}$, R$_{11}$, R$_{13}$, and R$_{14}$ is hydrogen.

In one embodiment, structure (I) includes R$_1$ that is a methyl group and R$_3$ is a t-butyl group. Each of R$_7$ and R$_{12}$ is an ethoxycarbonyl group. Each of R$_2$, R$_4$, R$_5$, R$_6$, R$_8$, R$_9$, R$_{10}$, R$_{11}$, R$_{13}$ and R$_{14}$ is hydrogen.

In one embodiment, R$_1$ is a methyl group and R$_3$ is a t-butyl group. Each of R$_7$ and R$_{12}$ is an ethoxy group. Each of R$_2$, R$_4$, R$_5$, R$_6$, R$_8$, R$_9$, R$_{10}$, R$_{11}$, R$_{13}$, and R$_{14}$ is hydrogen.

In one embodiment, structure (I) includes R$_1$ that is a methyl group and R$_3$ is a t-butyl group. Each of R$_7$ and R$_{12}$ is a diethylamino group. Each of R$_2$, R$_4$, R$_5$, R$_6$, R$_8$, R$_9$, R$_{10}$, R$_{11}$, R$_{13}$, and R$_{14}$ is hydrogen.

In one embodiment, structure (I) includes R$_1$ that is a methyl group and R$_3$ is a 2,4,4-trimethylpentan-2-yl group. Each of R$_2$, R$_4$ and R$_5$-R$_{14}$ is hydrogen.

In one embodiment, structure (I) includes R$_1$ and R$_3$, each of which is a sec-butyl group. Each of R$_2$, R$_4$ and R$_5$-R$_{14}$ is hydrogen.

In one embodiment, the substituted phenylene aromatic diester has a structure (IV) whereby R$_1$ and R$_2$ are members of a C$_6$ membered ring to form a 1,2-naphthalene moiety. Each of R$_5$-R$_{14}$ is hydrogen. Structure (IV) is provided below.

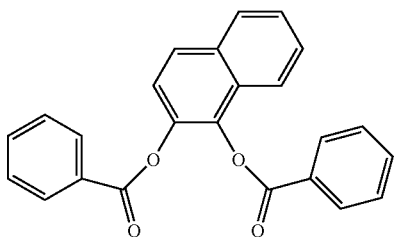 [SMILES: O=C(Oc1ccc2ccccc2c1OC(=O)c1ccccc1)c1ccccc1]

In one embodiment, the substituted phenylene aromatic diester has a structure (V) whereby R$_2$ and R$_3$ are members of a C$_6$ membered ring to form a 2,3-naphthalene moiety. Each of R$_5$-R$_{14}$ is hydrogen. Structure (V) is provided below.

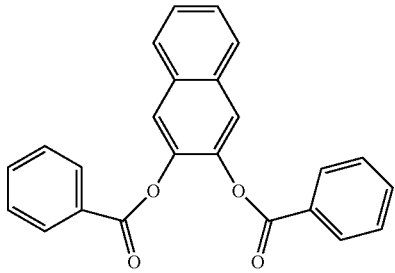 [SMILES: O=C(Oc1cc2ccccc2cc1OC(=O)c1ccccc1)c1ccccc1]

In one embodiment, structure (I) includes R$_1$ and R$_4$ that are each a methyl group. Each of R$_2$, R$_3$, R$_5$-R$_9$ and R$_{10}$-R$_{14}$ is hydrogen.

In one embodiment, structure (I) includes R$_1$ that is a methyl group. R$_4$ is an i-propyl group. Each of R$_2$, R$_3$, R$_5$-R$_9$ and R$_{10}$-R$_{14}$ is hydrogen.

In one embodiment, structure (I) includes R$_1$, R$_3$, and R$_4$, each of which is an i-propyl group. Each of R$_2$, R$_5$-R$_9$ and R$_{10}$-R$_{14}$ is hydrogen.

In one embodiment, each of R$_1$ and R$_4$ is selected from a methyl group, an ethyl group, and a vinyl group. Each of R$_2$ and R$_3$ is selected from hydrogen, a secondary alkyl group, or a tertiary alkyl group, with R$_2$ and R$_3$ not concurrently being hydrogen. Stated differently, when R2 is hydrogen, R3 is not hydrogen (and vice versa).

In one embodiment, a second internal electron donor may be used that generally comprises a polyether that can coordinate in bidentate fashion. In one embodiment the second internal electron donor is a substituted 1,3-diether of structure VI:

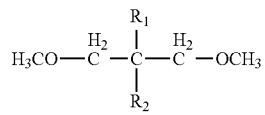

Where R$_1$ and R$_2$ are the same or different, methyl, C$_2$-C$_{18}$ linear or branched alkyls, C$_3$-C$_{18}$ cycloalkyl, C$_4$-C$_{18}$ cycloalkyl-alkyl, C$_4$-C$_{18}$ alkyl-cycloalkyl, phenyl, organosilicon, C$_7$-C$_{18}$ arylalkyl, or C$_7$-C$_{18}$ alkylaryl radicals; and R$_1$ or R$_2$ may also be a hydrogen atom.

In one embodiment the second internal electron donor may comprise a 1,3-diether with cyclic or polycyclic structure VII:

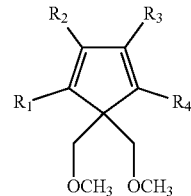

Where R$_1$, R$_2$, R$_3$, and R$_4$ are as described for R$_1$ and R$_2$ of structure VI or may be combined to form one or more C$_5$-C$_7$ fused aromatic or non-aromatic ring structures, optionally containing an N, O, or S heteroatom. Particular examples of the second internal electron donor include 4,4-bis(methoxymethyl)-2,6-dimethyl heptane, 9,9-bis(methoxymethyl)fluorene, or mixtures thereof.

The precursor is converted to a solid procatalyst by further reaction (halogenation) with an inorganic halide compound, preferably a titanium halide compound, and incorporation of the internal electron donors.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride.

The resulting procatalyst composition can generally contain titanium in an amount from about 0.5% to about 6% by weight, such as from about 1.5% to about 5% by weight, such as from about 2% to about 4% by weight. The solid catalyst can contain magnesium generally in an amount greater than about 5% by weight, such as in an amount greater than about 8% by weight, such as in an amount greater than about 10% by weight, such as in an amount greater than about 12% by weight, such as in an amount greater than about 14% by weight, such as in an amount greater than about 16% by weight. Magnesium is contained in the catalyst in an amount less than about 25% by weight, such as in an amount less than about 23% by weight, such as in an amount less than about 20% by weight. The internal electron donor can be present in the catalyst composition in an amount less than about 30% by weight, such as in an amount less than about 25% by weight, such as in an amount less than about 22% by weight, such as in an amount less than about 20% by weight, such as in an amount less than about 19% by weight. The internal electron donor is generally present in an amount greater than about 5% by weight, such as in an amount greater than about 9% by weight.

In one embodiment, the procatalyst composition is combined with a cocatalyst to form a catalyst system. A catalyst system is a system that forms an olefin-based polymer when contacted with an olefin under polymerization conditions. The catalyst system may optionally include an external electron donor, an activity limiting agent, and/or various other components.

As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In one embodiment, the cocatalyst is a hydrocarbyl aluminum cocatalyst represented by the formula $R_3Al$ wherein each R is an alkyl, cycloalkyl, aryl, or hydride radical; at least one R is a hydrocarbyl radical; two or three R radicals can be joined in a cyclic radical forming a heterocyclic structure; each R can be the same or different; and each R, which is a hydrocarbyl radical, has 1 to 20 carbon atoms, and preferably 1 to 10 carbon atoms. In a further embodiment, each alkyl radical can be straight or branched chain and such hydrocarbyl radical can be a mixed radical, i.e., the radical can contain alkyl, aryl, and/or cycloalkyl groups. Nonlimiting examples of suitable radicals are: methyl, ethyl, n-propyl, isopropyl, n-butyl, isobutyl, tert-butyl, n-pentyl, neopentyl, n-hexyl, 2-methylpentyl, n-heptyl, n-octyl, isooctyl, 2-ethylhexyl, 5,5-dimethylhexyl, n-nonyl, n-decyl, isodecyl, n-undecyl, n-dodecyl.

Nonlimiting examples of suitable hydrocarbyl aluminum compounds are as follows: triisobutylaluminum, tri-n-hexylaluminum, diisobutylaluminum hydride, di-n-hexylaluminum hydride, isobutylaluminum dihydride, n-hexylaluminum dihydride, diisobutylhexylaluminum, isobutyldihexylaluminum, trimethylaluminum, triethylaluminum, tri-n-propylaluminum, triisopropylaluminum, tri-n-butylaluminum, tri-n-octylaluminum, tri-n-decylaluminum, tri-n-dodecylaluminum. In one embodiment, preferred cocatalysts are selected from triethylaluminum, triisobutylaluminum, tri-n-hexylaluminum, diisobutylaluminum hydride, and di-n-hexylaluminum hydride, and most preferred cocatalyst is triethylaluminum.

In one embodiment, the cocatalyst is a hydrocarbyl aluminum compound represented by the formula $R_nAlX_{3-n}$ wherein n=1 or 2, R is an alkyl, and X is a halide or alkoxide. Nonlimiting examples of suitable compounds are as follows: methylaluminoxane, isobutylaluminoxane, diethylaluminum ethoxide, diisobutylaluminum chloride, tetraethyldialuminoxane, tetraisobutyldialuminoxane, diethylaluminum chloride, ethylaluminum dichloride, methylaluminum dichloride, and dimethylaluminum chloride.

In one embodiment, the catalyst composition includes an external electron donor. As used herein, an "external electron donor" is a compound added independent of procatalyst formation and contains at least one functional group that is capable of donating a pair of electrons to a metal atom. Bounded by no particular theory, it is believed that the external electron donor enhances catalyst stereoselectivity, (i.e., to reduces xylene soluble material in the formant polymer).

In one embodiment, the external electron donor may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In one embodiment, the external electron donor is an alkoxysilane. The alkoxysilane has the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms, said R' containing up to 20 atoms not counting hydrogen and halogen; R' is a $C_{1-4}$ alkyl group; and m is 0, 1, 2 or 3. In an embodiment, R is $C_{6-12}$ aryl, alkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In one embodiment, the silane composition is dicyclopentyldimethoxysilane (DCPDMS), methylcyclohexyldimethoxysilane (MChDMS), diisopropyldimethoxysilane (DIPDMS), n-propyltrimethoxysilane (NPTMS), diethylaminotriethoxysilane (DATES), or n-propyltriethoxysilane (PTES), and any combination of thereof.

In one embodiment, the external donor can be a mixture of at least 2 alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In one embodiment, the external electron donor is selected from one or more of the following: a benzoate, and/or a diol ester. In another embodiment, the external electron donor is 2,2,6,6-tetramethylpiperidine. In still another embodiment, the external electron donor is a diether.

In one embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced.

The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), poly(alkene glycol)ester, a diol ester, and combinations thereof. The carboxylic acid ester can be an aliphatic or aromatic, mono- or polycarboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

In one embodiment, the external electron donor and/or activity limiting agent can be added into the reactor separately. In another embodiment, the external electron donor and the activity limiting agent can be mixed together in advance and then added into the reactor as a mixture. In the mixture, more than one external electron donor or more than one activity limiting agent can be used. In one embodiment, the mixture is dicyclopentyldimethoxysilane and isopropyl myristate, dicyclopentyldiniethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, and dicyclopentyldimethoxysilane and tetraethoxysilane and isopropyl myristate, and combinations thereof.

In one embodiment, the catalyst composition includes any of the foregoing external electron donors in combination with any of the foregoing activity limiting agents.

The catalyst system as described above has been found to be particularly well suited for producing the heterophasic polymer composition of the present disclosure.

Due to the physical properties of the polypropylene composition of the present disclosure, especially the flow properties of the composition, the composition is well suited to producing molded articles. The polypropylene composition, for instance, can be used in injection molding, blow molding, and rotational molding applications.

The polypropylene polymer composition of the present disclosure can be used to make numerous and diverse articles and products. Due to the polymer composition having high transparency properties in combination with excellent impact resistance properties, the polymer composition is particularly well suited to producing storage containers. The storage container, for instance, may be food packaging. Due to the impact resistance properties of the polymer, the storage container, for instance, can be used to place food items in a freezer. Referring to FIG. 1, for instance, one embodiment of a storage container made in accordance with the present disclosure is shown. As illustrated, the storage container 10 includes a container portion 14 that defines a hollow interior for receiving one or more items. The container portion 14 can be matched to a lid 12. The lid 12 can include a channel and flange that interlocks with a rim of the container portion 14. In accordance with the present disclosure, the contents of the container 10 can be viewed through the walls of the container.

In addition to food containers, various other storage containers can be made in accordance with the present disclosure. For instance, larger storage containers can be made using the polymer composition of the present disclosure. The larger storage containers for instance, can be designed for storing different items in an attic, garage or other storage facility where temperature swings can occur.

The present disclosure may be better understood with reference to the following examples.

Examples

Various different heterophasic polypropylene copolymer samples were produced and tested for various properties including impact strength and haze. The heterophasic copolymers were made generally using the process described above in conjunction with the catalyst described above. In particular, the copolymers were made in a dual reactor setup known as sequential polymerization where the matrix polymer was made in a first gas phase reactor and then the contents of the first reactor were passed to a second gas phase reactor. Ethylene was used as the comonomer. Ethylene content was controlled in the first phase polymer and the second phase polymer.

Polymer pellet samples were produced that were injected molded into specimens. An additive package was added to the polymer during pelletizing which included 1000 ppm of pentaerythritol tetrakis(3-(3,5-di-tert-butyl-4-hydroxyphenyl)propionate); 1000 ppm of tris(2,4-ditert-butylphenyl) phosphite; 180 ppm of an acid scavenger (hydrotalcite); 2000 ppm of glycerol monostearate; and 4000 ppm of a clarifying agent. The specimens were made according to ASTM Test D4101 to produce specimens for flex and IZOD Testing.

The following polypropylene compositions were produced:

TABLE 1

| | Sample No. 1 | Sample No. 2 | Sample No. 3 | Sample No. 4 | Sample No. 5 | Sample No. 6 |
|---|---|---|---|---|---|---|
| Ethylene content in the matrix polymer (wt %) | 3.5 | 3.5 | 3.5 | 3.5 | 3.5 | 3.5 |
| Xylene solubles matrix polymer (%) | 4 | 6 | 6 | 6 | 6 | 6 |
| Xylene solubles total (%) | 21.2 | 18.2 | 21.7 | 19.7 | 22.9 | 6 |
| MFR (g/10 min) | 23.8 | 20.9 | 19.1 | 19.0 | 18.9 | 26 |

Samples Nos. 1-5 were made in accordance with the present disclosure. Sample No. 6 is a typical random copolymer and is a comparative sample.

The above compositions were tested for various properties. The following results were obtained:

TABLE 2

| | Sample No. 1 | Sample No. 2 | Sample No. 3 | Sample No. 4 | Sample No. 5 | Sample No. 6 |
|---|---|---|---|---|---|---|
| b/a | 1.1 | 1.1 | 1.1 | 1.4 | 1.8 | — |
| Flexural Modulus (MPa) | 565.5 | 624.6 | 545.1 | 563.9 | 570.6 | 1070 |
| IZOD@ 23 C. (J/m) | 438.1 | 379.2 | 477.0 | 455.9 | 444.9 | 54 |
| IZOD@ 0 C. (J/m) | 90.6 | 66.8 | 97.6 | 102.3 | 92.0 | 21 |

TABLE 2-continued

|  | Sample No. 1 | Sample No. 2 | Sample No. 3 | Sample No. 4 | Sample No. 5 | Sample No. 6 |
|---|---|---|---|---|---|---|
| IZOD@-20 C. (J/m) | 18.0 | 18.0 | 19.4 | 18.8 | 20.5 | 14 |
| Gardner @ 0 C. (inch-lbs) | 331.6 | 304.0 | 324.8 | 310.4 | 323.2 | <18 |
| Gardner@ -20 C. (inch-lbs) | <8 | <8 | <8 | 26.0 | <8 | <8 |
| Yield Stress % | 19.9 | 21.6 | 19.6 | 20.3 | 20.1 |  |
| Haze (1 mm) % | 8.5 | 7.1 | 7.3 | 9.1 | 11.0 | 5.1 |
| Koenig B (XS) | — | 0.86 | 0.85 | — | — | — |
| Koenig B (XI) | — | 0.86 | 0.83 | — | — | — |

As shown above, the polypropylene heterophasic polymer compositions above displayed excellent impact resistance strength in combination with extremely low haze.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A polypropylene composition comprising:
a first polymer phase comprising a polypropylene random copolymer, the polypropylene random copolymer containing ethylene in an amount of less than about 4% by weight;
a second polymer phase combined with the first polymer phase, the second polymer phase comprising a propylene ethylene copolymer containing ethylene in an amount from about 10% to about 20% by weight; and
wherein the polypropylene composition has a melt flow rate of 15 g/10 min or greater at a temperature of 230° C. and at a load of 2.16 kg, the composition having a Gardner drop impact strength at 0° C. of from about 300 inch-lbs to about 500 inch-lbs.

2. The polypropylene composition of claim 1, wherein the composition further contains a clarifier in an amount less than about 1% by weight and wherein the polypropylene composition has a haze at 1 mm of less than about 15%.

3. The polypropylene composition of claim 1, wherein the composition has a flexural modulus of from about 400 MPa to about 1000 MPa.

4. The polypropylene composition of claim 1, wherein the composition has an IZOD impact strength at 23° C. of greater than about 200 J/m and at 0° C. of greater than about 80 J/m.

5. The polypropylene composition of claim 1, wherein the polypropylene composition has a total cold xylene solubles content of from about 15% to about 30%.

6. The polypropylene composition of claim 1, wherein the polypropylene random copolymer in the first polymer phase has an intrinsic viscosity and the propylene ethylene copolymer in the second polymer phase has an intrinsic viscosity and wherein a ratio of intrinsic viscosity of the second phase polymer to the first phase polymer is from about 1.1 to about 2.

7. The polypropylene composition of claim 1, wherein the polypropylene random copolymer in the first polymer phase contains ethylene in an amount from about 2% to about 3.5% by weight.

8. The polypropylene composition of claim 1, wherein the propylene ethylene copolymer in the second polymer phase contains ethylene in an amount from about 14% to about 17% by weight.

9. The polypropylene composition of claim 1, wherein the second polymer phase is present in the polypropylene composition in an amount from about 20% to about 40% by weight.

10. The polypropylene composition of claim 1, wherein the polypropylene composition has a haze at 1 mm of less than about 10%, has a notched IZOD impact strength at 23° C. of from about 300 J/m to about 900 J/m and has a notched IZOD impact strength of 0° C. of from about 100 J/m to about 600 J/m.

11. The polypropylene composition of claim 1, wherein the polypropylene composition has a melt flow rate of from about 17 g/10 min to about 30 g/10 min.

12. The polypropylene composition of claim 1, wherein the polypropylene random copolymer in the first polymer phase has been Ziegler-Natta catalyzed and wherein the propylene ethylene copolymer in the second polymer phase has also been Ziegler-Natta catalyzed.

13. The polypropylene composition of claim 12, wherein the Ziegler-Natta catalysts used for producing the polypropylene random copolymer of the first polymer phase and the propylene ethylene copolymer of the second polymer phase both include an internal electron donor comprising a substituted phenylene aromatic diester.

14. The polypropylene composition of claim 13, wherein the composition has a xylene soluble portion and wherein the xylene soluble portion has a Koenig B value of from 0.75 to less than 1.

15. The polypropylene composition of claim 13, wherein the composition has a xylene insoluble portion and wherein the xylene insoluble portion has a Koenig B value of from 0.75 to less than 1.

16. The polypropylene composition of claim 1, wherein the polypropylene random copolymer of the first polymer phase has a xylene soluble fraction of less than about 10%.

17. The polypropylene composition of claim 1, wherein the composition further contains an antacid and an antioxidant.

18. An injection molded article formed from the polypropylene composition of claim 1.

19. A storage container formed from the polypropylene composition of claim 1.

20. The storage container of claim 19, wherein the storage container comprises food packaging.

* * * * *